United States Patent [19]
Campbell et al.

[11] Patent Number: 6,062,328
[45] Date of Patent: *May 16, 2000

[54] ELECTRIC HANDCART

[76] Inventors: Jeffery D. Campbell, 2686 N. Argyle St., Fresno, Calif. 93927; Rick Dean Fox, 1034 Live Oak Dr., Santa Cruz, Calif. 95062

[ * ] Notice: This patent issued on a continued prosecution application filed under 37 CFR 1.53(d), and is subject to the twenty year patent term provisions of 35 U.S.C. 154(a)(2).

[21] Appl. No.: 09/090,033

[22] Filed: Jun. 10, 1998

[51] Int. Cl.[7] ................................ B60K 1/00; B62B 3/00
[52] U.S. Cl. ...................... 180/65.6; 180/65.1; 180/216; 180/908; 280/47.12; 280/47.131
[58] Field of Search ..................... 180/65.6, 8.1, 180/8.4, 65.1, 216, 908; 280/47.12, 47.131, 47.27, 47.24, 62, DIG. 5, DIG. 11, DIG. 9, 651, 652

[56] References Cited

U.S. PATENT DOCUMENTS

| | | | |
|---|---|---|---|
| 2,417,613 | 3/1947 | Radabaugh | 180/19.1 |
| 2,706,008 | 4/1955 | Voigt | 180/19.2 |
| 3,041,085 | 6/1962 | White | 280/655.1 |
| 3,123,173 | 3/1964 | Jacobs | 180/343 |
| 3,312,300 | 4/1967 | Jones | 180/19.2 |
| 3,513,924 | 5/1970 | Jackson | 180/14.1 |
| 3,704,758 | 12/1972 | Cropp | 180/19.1 |
| 3,719,247 | 3/1973 | Hollis | 180/19.3 |
| 3,867,993 | 2/1975 | Lizuka | 180/19.1 |
| 4,106,583 | 8/1978 | Nemeth | 180/65.6 |
| 4,429,758 | 2/1984 | Meshulam | 280/47.12 |
| 4,570,732 | 2/1986 | Craven | 180/19.3 |
| 4,750,578 | 6/1988 | Btandenfels | 180/13 |
| 4,762,193 | 8/1988 | Levine | 180/65.1 |
| 4,878,554 | 11/1989 | Dion | 180/19.3 |
| 5,370,572 | 12/1994 | Lee | 446/462 |
| 5,685,385 | 11/1997 | Sanuga | 180/65.1 |
| 5,711,388 | 1/1998 | Davies et al. | 180/168 |
| 5,749,588 | 5/1998 | Stallbaumer | 280/47.27 |
| 5,779,251 | 7/1998 | Meier | 280/47.2 |

*Primary Examiner*—Kevin Hurley
*Assistant Examiner*—Andrew J. Fischer
*Attorney, Agent, or Firm*—Jeffrey A. Hall

[57] ABSTRACT

An electric powered handcart includes a frame, the frame having a proximal and a distal end thereto, a pair of downwardly depending support elements, and a pair of frame brackets. A load plate and a handle are secured to the frame, the handle being secured to one of the pair of frame brackets. A set of wheels is secured to the distal end of the frame and a rear third wheel is secured to the frame and is positioned above and behind the set of wheels secured to the distal end of the frame. An electric motor is operably mounted to the frame and a battery for powering the motor is secured to a battery mount attached to the frame. A drive linkage for driving the set of wheels is operably linked to the motor and to the pair of wheels and a throttle control for controlling the motor speed is secured the frame.

1 Claim, 2 Drawing Sheets

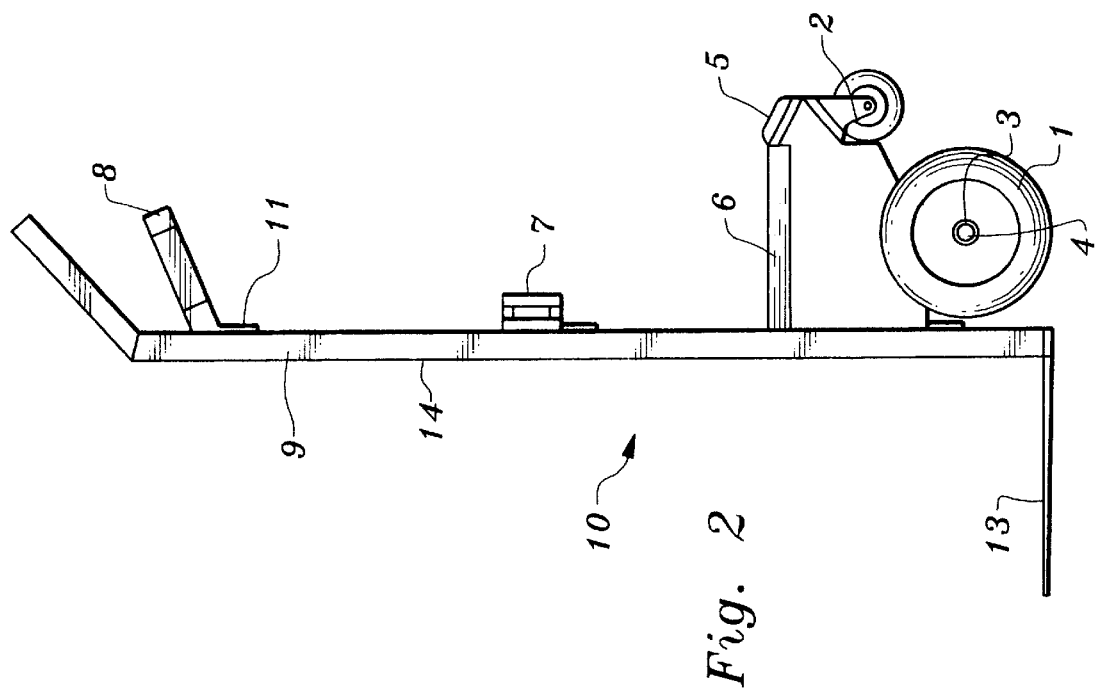
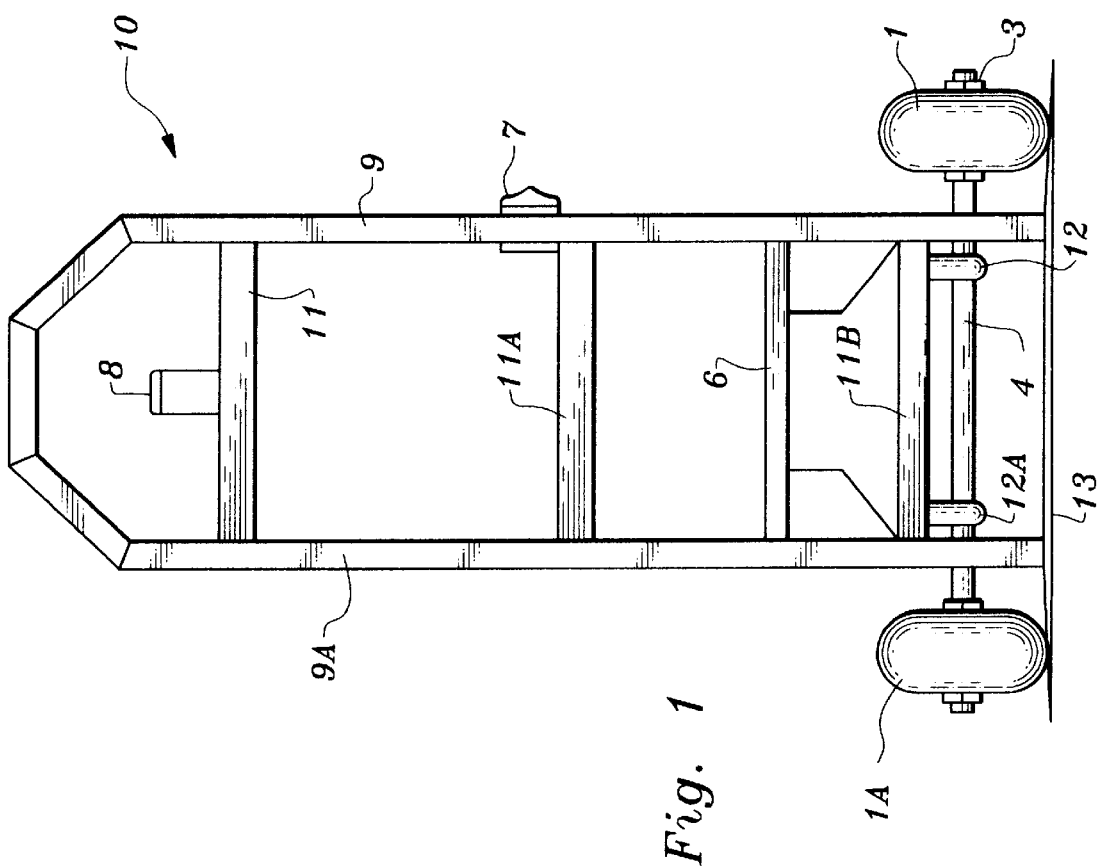

ELECTRIC HANDCART

FIELD OF INVENTION

This invention relates to handcarts, and more particularly to handcarts which are equipped with a third rear wheel and an electric motor for powering the handcart.

DESCRIPTION OF RELATED ART

The usefulness of handcarts is well known to those involved in construction, warehouse operations, shipping, gardening, and other uses where loads are moved and transported from one place to another. The handcart is a unique tool in that a relatively heavy load may be balanced and moved with moderate effort.

The present invention is an electric powered handcart having a third rear wheel secured to the ends of the handcart handles and a battery operated electric motor and drive mechanism for powering the handcart.

Accordingly, it is the primary object of this invention to provide a handcart which is lightweight, strong, balanced, and efficient at carrying and transporting a wide range of load sizes and weights and which is equipped with a third rear wheel for balance and ease of use. The handcart of the present invention is also equipped with an electric motor and drive mechanism for facilitating the transport of loads, whether heavy, light, moderate or bulky loads and has high performance capability and is balanced and safe to use with all load sizes.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein an electric powered handcart is provided including a frame with a proximal and a distal end thereto, a pair of downwardly depending support elements, and a pair of frame brackets. A load plate and a handle are secured to the frame, the handle being secured to one of the pair of frame brackets. A set of wheels is secured to the distal end of the frame as in a conventional handcart and a rear third wheel is secured to the frame and is positioned above and behind the set of wheels secured to the distal end of the frame. An electric motor is operably mounted to the frame and a battery for powering the motor is secured to a battery mount attached to the frame. A drive linkage for driving the set of wheels is operably linked to the motor and to the pair of wheels and a throttle control for controlling the motor speed is secured to the frame.

The electric powered handcart of the present invention is lightweight, balanced, efficient, and highly effective at allowing a user to transport loads of all sizes with great maneuverability, balance, and control. The handcart of the present invention allows a user to transport loads which ordinarily could not be easily or efficiently transported by a conventional handcart, thereby providing both a highly efficient and safe transport means.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a left side elevational view of an electric handcart, according to the invention.

FIG. 2 is a front view of such electric handcart, according to the invention.

DESCRIPTION OF THE PREFERRED EMBODIMENT

Figure 3:
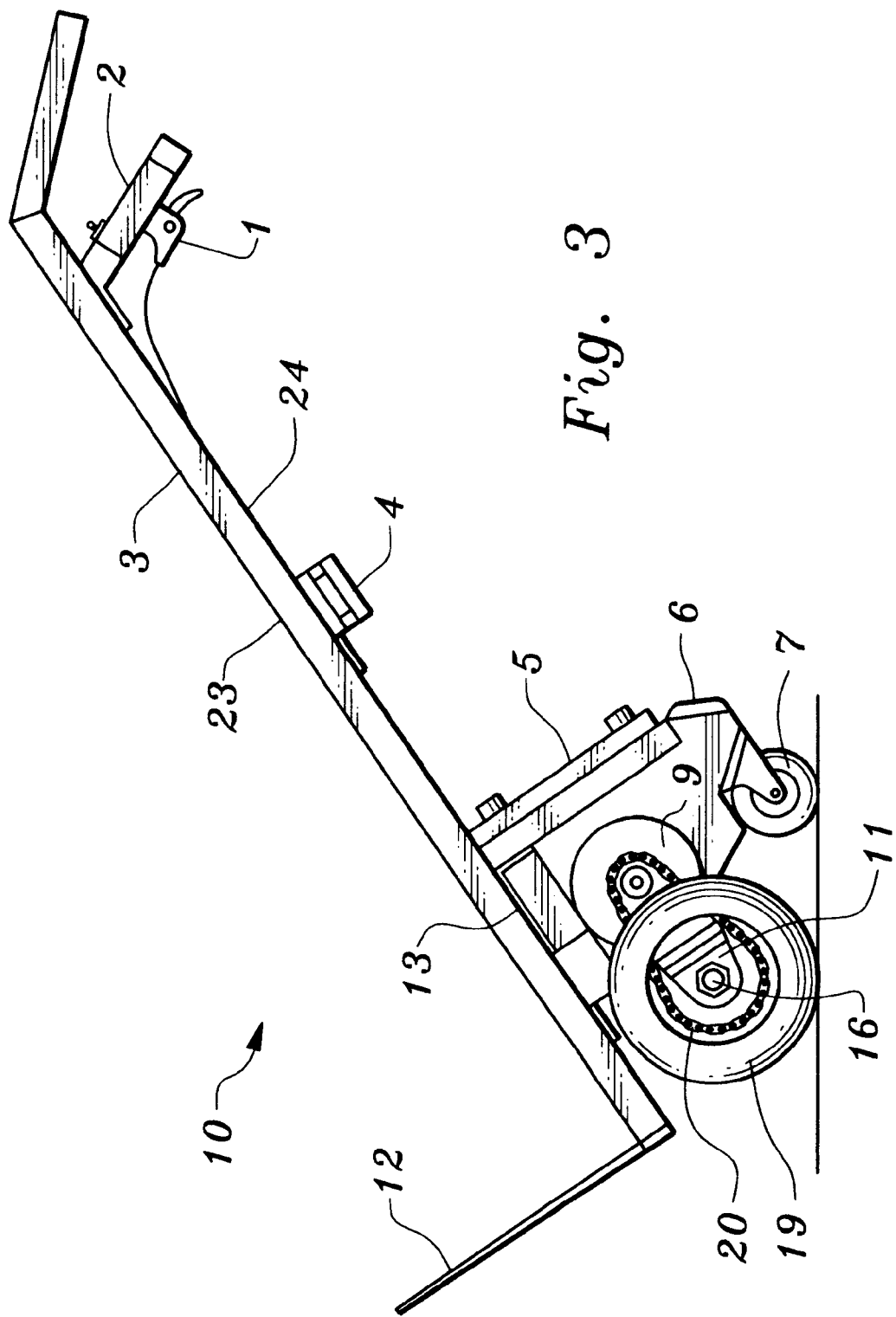
FIG. 3 is a left side view of such electric handcart, according to the invention.

Reference will now be made in detail to the present preferred embodiments of the invention as illustrated in the accompanying drawings.

In accordance with the present invention, there is provided in a preferred embodiment of the invention, an electric powered handcart with a frame, the frame having a proximal and a distal end thereto, a pair of downwardly depending support elements, and a pair of frame brackets. A load plate and a handle are secured to the frame, the handle being secured to one of the pair of frame brackets. A set of wheels is secured to the distal end of the frame and a rear third wheel is secured to the frame and is positioned above and behind the set of wheels secured to the distal end of the frame. An electric motor is operably mounted to the frame and a battery for powering the motor is secured to a battery mount attached to the frame. A drive linkage for driving the set of wheels is operably linked to the motor and to the pair of wheels, and a throttle control for controlling the motor speed is secured the frame.

In accordance with the present invention, there is also provided an improved handcart of the type in which a frame with a proximal and a distal end and a pair of downwardly depending support elements, has a set of wheels secured to the distal end of the frame, and a load plate mounted to the frame, wherein the improvement comprises, a rear wheel is secured to the frame and being positioned both above and behind the set of wheels secured to the distal end of the frame, an electric powered motor is operably connected to a battery and to drive means for driving the set of wheels, and a throttle control means is provided for controlling the motor speed.

In FIG. 1, an electric handcart 10 is shown according to a preferred embodiment of the invention with frame 3 preferably with handle 2 with a rubber grip. Frame 3 has front side 23 and rear side 24 and is preferably composed of steel or other durable resilient material. Frame 3 is preferably configured with downwardly depending support elements 3A and frame brackets 18 and 18A. The frame preferably has handle 2 secured to frame bracket 18. A load plate 12 is preferably secured to frame 3 by welding or other fastening means such as bolts, screws or the like. A recoiling load strap 4 may be provided and may include a locking latch if desired.

As seen in FIGS. 1 and 2, a set of wheels 19 is shown secured to the distal end of frame. Wheels 19 are preferably rubber pneumatic wheels. A rear third wheel 7 is shown secured to frame 3 and positioned above and behind wheels 19. Also shown are collars 17 secured to wheels 19. Rear third wheel 7, as seen in FIG. 3 is used to support and facilitate balance and movement of electric handcart 10 and is preferably secured to mounting frame 8 and mount 6, mount 6 preferably has a rubber foot pad mounted thereon.

A motor 9, seen in FIGS. 1, 2, and 3, is shown mounted to frame 3. Motor 9 is preferably an electric gear reduction type motor of about ½ to 1 horsepower, but may be otherwise. Preferably motor 9 is secured to frame 3 with a bracket mount and is operably linked to drive chain 20 communicatively linked to drive sprocket 25 and drive axle 16 which is secured to axle mount 11. When activated such drive means drive wheels 19 moving electric handcart 10 in a forward direction. A automation type control box 13 is shown operably linked to rear third wheel 7 and to motor 9 for automatic motor control. Control box 13 is activated when rear third wheel 7 is pressed against a surface such as the ground.

A battery 5 powers motor 9 and is preferably a 12 volt cell type battery. Battery 5 is mounted on battery mount 14 and is operably linked to converter 15. An electric "dead switch" 21 is operably linked to motor 9 and when in an "on" position permits motor 9 to operate.

Throttle control means for controlling the motor speed are provided by a throttle control 1 operably linked to motor 9 and frame 3. Preferably the throttle control means is a variable spring loaded throttle control which is hand operated by the user. Of course, other throttle types may be used if desired.

In operation and use, the user grasps handle 2 preferably placing a finger on throttle control 1. Then switch 21 is turned to the "on" position and the throttle control 1 is depressed while electric handcart 10 is leaned back on rear third wheel 7 which engages automation control unit 13 which engages motor 9. Drive sprocket 25 is then engaged by chain drive 20. The drive axle 16 then engages wheels 19. When the handcart is loaded the user then release throttle control 1 and tilts electric handcart 10 to about 95 degrees, pushes the loaded electric handcart 10 by rubber footpad 6, and then leans electric handcart 10 back on rear third wheel 7. The user then may pull recoil strap 4 around the load and latches the strap into a locked position.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed:

1. A battery powered handcart, comprising:

a frame, said frame having a proximal and a distal end thereto, a pair of downwardly depending support elements, and a pair of frame brackets;

a load plate secured to said frame;

a handle secured to said frame, said handle being secured to one of said pair of frame brackets;

a set of wheels secured to the distal end of the frame;

a rear third wheel secured to said frame and being positioned above and behind said set of wheels secured to the distal end of the frame, said rear third wheel being detachably mounted to said frame and is operably linked to a control box which is activated when said third rear wheel touches a surface;

an electric gear reduction motor having a bracket mount secured thereto, said bracket mount being operably mounted to said frame; said electric gear reduction motor being linked to a drive chain communicatively linked to a drive sprocket and to a drive axle secured to an axle mount;

a battery for powering said motor secured to a battery mount attached to the frame; and a variable spring loaded throttle control for controlling the motor speed, said variable spring loaded throttle control being secured the frame.

* * * * *